United States Patent [19]

Brethour et al.

[11] Patent Number: 6,098,150
[45] Date of Patent: *Aug. 1, 2000

[54] METHOD AND APPARATUS FOR FETCHING INFORMATION FROM A CACHE MEMORY

[75] Inventors: Vernon Brethour, Owens Crossroads, Ala.; Raymond A. Heald, Los Altos, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/559,972

[22] Filed: Nov. 17, 1995

[51] Int. Cl.$^7$ ..................................................... G06F 12/00
[52] U.S. Cl. ........................... 711/128; 711/3; 711/144; 711/137; 711/201; 711/213
[58] Field of Search ............................... 395/178, 3, 207, 395/137, 157, 800.23; 711/204, 206, 208, 144, 213, 207, 219, 128, 3, 201, 125; 707/7

[56] References Cited

U.S. PATENT DOCUMENTS

| | | | |
|---|---|---|---|
| 5,197,146 | 3/1993 | LaFetra | 711/144 |
| 5,285,527 | 2/1994 | Crick et al. | 711/118 |
| 5,367,653 | 11/1994 | Coyle et al. | 711/128 |
| 5,367,659 | 11/1994 | Iyengar et al. | 711/136 |
| 5,381,533 | 1/1995 | Peleg et al. | 395/391 |
| 5,390,318 | 2/1995 | Ramakrishnan et al. | 711/158 |
| 5,412,787 | 5/1995 | Forsyth et al. | 395/417 |
| 5,418,922 | 5/1995 | Liu | 711/3 |
| 5,450,561 | 9/1995 | Ryan | 395/403 |
| 5,493,667 | 2/1996 | Huck et al. | 711/125 |
| 5,509,131 | 4/1996 | Smith et al. | 711/206 |
| 5,530,833 | 6/1996 | Iyengar et al. | 711/128 |
| 5,537,573 | 7/1996 | Ware et al. | 395/464 |
| 5,588,128 | 12/1996 | Hicok et al. | 711/204 |
| 5,640,532 | 6/1997 | Thome et al. | 711/128 |
| 5,689,672 | 11/1997 | Wift et al. | 395/389 |
| 5,717,916 | 2/1998 | Verma | 707/7 |
| 5,752,069 | 5/1998 | Roberts et al. | 395/800.23 |

OTHER PUBLICATIONS

Mori, Shigeru, et al., "A 45–ns 64–Mb DRAM with a Merged Match–Line Test Architecture," *IEEE J. Solid–State Circuits*, 26(11):1486–91 (Nov. 1991).

John P. Hayes, "Computer Architecture and Organization", McGraw–Hill, Inc., pp 380–381, 1978.

*Primary Examiner*—Eddie P. Chan
*Assistant Examiner*—Hong Kim
*Attorney, Agent, or Firm*—Townsend and Townsend and Crew LLP

[57] ABSTRACT

The present invention relates to a method and apparatus for efficiently outputting words from an N-way set-associative cache. In one embodiment, the cache tags contain information indicating which set contains a line holding data succeeding the last word in the line accessed during a cache read. For a cache which outputs M words for each access, when the addressed word is within M-1 words of the end of the line, the cache will output all the words from the accessed word to the end of the line and the remainder of the M words from a succeeding line in whatever set is indicated by the pointer.

20 Claims, 4 Drawing Sheets

METHOD AND APPARATUS FOR FETCHING INFORMATION FROM A CACHE MEMORY

The present invention is generally directed to a method and apparatus for fetching instructions in a computer and, in particular, is directed to the efficient fetching of series of instructions stored in an N-way set associative cache.

BACKGROUND OF THE INVENTION

Many computer systems utilize cache memories to reduce delays associated with the fetching of items, e.g., instructions, stored in main memory. Memory access time is a factor which frequently limits host processor throughput. Accordingly, cache memories are often used.

FIG. 1 depicts a simplified configuration of a instruction cache memory system 10. An instruction cache 20 is disposed between main memory 24 and an execution unit 12. A number of other execution units 13 may also be coupled to main memory 24. Here, instruction cache 20 serves to expedite memory access times for execution unit 12. After the execution unit 12 has executed an instruction, the program counter 14 points to the next instruction or the predicted next instruction. In some cases, it is necessary to do a full or partial translation of the address output by the program counter, e.g., from a virtual address to a physical address. It may also be necessary to do a look-up of the physical address, based on the virtual address. This may be done by using a paging unit 16 and a translation lookaside buffer (TLB 17) in manners well known in the art. The system provides the address of the next (or predicted next) instruction to the cache control 18. By comparing portions of the instruction with one or more tags, the cache control 18 can determine whether the requested instruction address presently resides in the instruction cache 20. If the necessary instruction is not in the instruction cache 20 (a "miss") the cache control 18 provides controls 22 resulting in transfer of a block of instructions from main memory 24 into the cache 20. Access to the cache is then re-tried.

If the cache 20 contains the needed instruction (a "hit"), one or more instruction words, including the word whose address is in the program counter 14, are output from the cache 20. Typically, a number of words will be output at any one time. Transfers of four words are common. These words may, e.g., be stored in an instruction buffer 26 which can typically hold a number of instructions. Thus, there will normally be a plurality of instructions that the execution unit 12 can rapidly access. This is useful since the execution unit 12 may, during certain periods, (e.g., when the cache 20 is being written-into after a cache miss) be receiving instructions more rapidly then are being output by the cache 20. In some cases, however, instructions that have accumulated in the instruction buffer 26 are invalidated or deleted. For example, this can occur when the execution unit 12 has taken a branch instruction and a new sequence of instructions need to be input to the execution unit 12.

In cases where more than one execution unit is allowed access to main memory and the cache is written-to, the system will normally include some method of assuring that the data in the cache 20 and the memory 24 correspond to one another. This is typically referred to as maintaining "cache coherency". A number of cache coherency techniques are known. Examples are the techniques referred to as "write through" and "write back". In some systems cache coherency is maintained by using a bus watch unit 28. This unit 28 monitors the global address bus 31 to detect, e.g., write operations to memory by other bus masters (not shown). This allows the cache controller 18 to invalidate a cache entry when another device writes to a location in shared memory.

A number of cache to memory mapping techniques are known. One technique is known as "set-associative mapping" where the cache is considered as being divided into two or more sets (otherwise termed "banks", "compartments", or "ways"). FIG. 2 depicts an example two-way set-associative cache 20. In this figure the cache 20 contains a first set or compartment 32 and a second set or compartment 34. Each compartment 32, 34 contains a plurality of slots or lines 36a–36n, 38a–38n. Each line contains a number of words 42a–42k, 44a–44k. For the purposes of discussion, throughout this specification a cache system which retrieves four words per access will be described. Further, the exemplary system described will include eight words per line. Those skilled in the art will recognize that a different number of words can be retrieved per access and that lines of a set associative cache may contain more than eight words.

One of the problems in previous instruction fetch methods involves the situation where a fetch occurs for a word which is located near the end of one the lines 36a–36n, 38a–38n. This can occur relatively frequently, for example, after a branch instruction has been taken. In normal operation, when the program counter 14 points to an instruction which is not near the end of the line, such as word 45b, the cache 20 will output a number of words (e.g., four words 45b, 45c, 45d, 45e) after the tag has first been used to verify that the requested data is the data present on line 36a. When the access is near the beginning of line 36a this is performed easily since it is known that a given slot or line of the cache contains a series of instruction words with consecutive addresses, i.e., it is known that the instruction word having an address next-exceeding the address of word 45b will be word 45c.

However, near the end of the line 36a it is unknown, in current systems, what the next succeeding word after the last word in the line 45k will be. In a typical situation, the succeeding word after 45k will be either the first word in the next line (i.e., 46a) or the first word 48a in a corresponding line 38b in the other set 34 of the cache 20. However, in previous set-associative systems, the information regarding which of these locations held the next succeeding instruction after the last instruction 45k of a line 36a was not available. Therefore, in previous devices when a read access was made for a word near the end of a line, such as 45j, the words at the end of the line such as 45j and 45k could be output to the instruction buffer 26, but the next word after 45k could not be output because its location was not available. Typically this would result in a need to consult, e.g., the TLB 17 or to take other action necessary to discern the location of the next word and to then try a second access of the cache 20. Thus it can be seen that while, for accesses a distance from the end of a line, the average yield per access was an output of a number of words, e.g, four words per access (as above). However, when an access was made near the end of a line, an access could result in the output of fewer than four valid words.

There are several circumstances where this reduced efficiency of cache access near the end of lines is particularly troublesome. The closer the initial access address is to the end of the line the worse the efficiency. For example, if there was an access of word 45k, only a single word would be useful to the instruction buffer 26 during that access of the cache rather than four words. Additionally, systems which are configured to output more than four words per cache access have an even greater relative reduction in efficiency near the end of the line compared to the reduction that occurs away from the end of the line. As will be apparent, if each access of the cache normally results in an output of i words, and a cache line is k words long, the potential for problems near the end of the line will arise whenever the access is between the (k−i+1)th word of the line and the Kth word of the line. Furthermore, the problem is exacerbated if the access near a cache line end occurs at a time when an instruction buffer 26 is empty. This situation frequently occurs after a branch has been taken.

FIG. 3 depicts a cache tag which could be used with the cache system described above. In this embodiment, the tag includes several sections 54a, 54b, 54c, 54d, one section for each word. For a four-word per access cache, for example, the respective tag would contain four sections as depicted. Each section, of which 54a is representative, contains several entries including, e.g., a real or virtual address tag (ADDRESS) which will typically be a portion of the address of the corresponding word in main memory. Several flags are also contained within each tag. As those of skill in the art know, a "dirty" flag (typically one bit which may be used, e.g., for cache coherency purposes) and a valid flag, may be used to indicate whether the data stored at this location of cache is valid data.

Accordingly, a system is needed which reduces the inefficiencies resulting from accesses near the end of a line in a set-associative cache system.

SUMMARY OF THE INVENTION

The present invention addresses the problem of access near the end of a cache line by providing information which permits determination of the location of the next word following the word at the end of a line. In one specific embodiment, the information is contained in an expanded tag.

In a context of a N-way set-associative cache having N sets or compartments with each compartment organized into a plurality of multi-word lines, the cache receives a tag word which includes an address and in response, outputs M words. In a two-way set-associative cache, N=2 and in a four-way set-associative cache, N=4. In a system where, in response to a cache access, four words are output, M=4. According to one embodiment of the invention, a first tag which addresses a first word held in a first line of one of the N compartments is input to the cache. Substantially simultaneously, information is also input to the cache indicating which of the N compartments contains a line which holds at least one other word that succeeds the word at the end of the line holding the first word. When the addressed word is within M-1 words of the end of the line containing the addressed word, the cache outputs M words including at least the addressed word and at least one other word. Preferably, the information is included as a part of the tag information.

In one embodiment, "pointer valid" information is also included which determines whether the pointer to the location of the next succeeding line points to valid data. The data on the next succeeding line could be invalid if, for example, the end of the currently-addressed line also represents the end of a successive string of instructions or "instruction thread".

In another embodiment the cache is a two-way set-associative cache and each tagged portion for each word requires only two additional bits, a first bit to indicate whether the next succeeding word is in the first set or the second set of the set-associative tag, and the second bit indicating whether or not the pointer to the next succeeding line is valid. In yet another embodiment, the cache is four-way set-associative, and three or more additional bits per word are provided in the tag for pointing to the next successive line.

For a fuller understanding of the nature and advantages of the invention, reference should be made to the ensuing description taken in conjunction with the accompanying drawings.

DESCRIPTION OF THE PREFERRED EMBODIMENT

Figure 1:
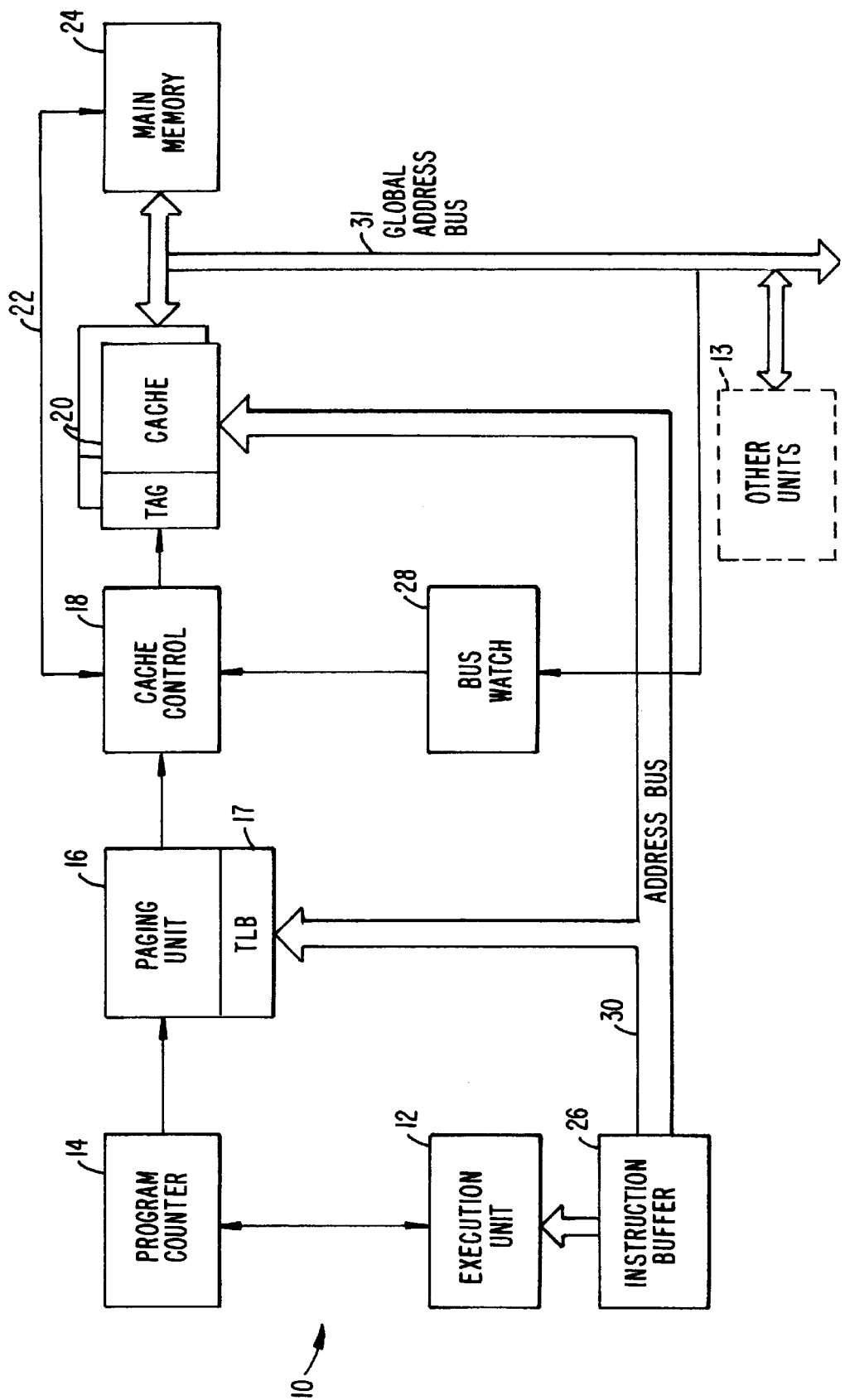
FIG. 1 is a simplified block diagram of a computer system including an instruction cache.
Figure 4:
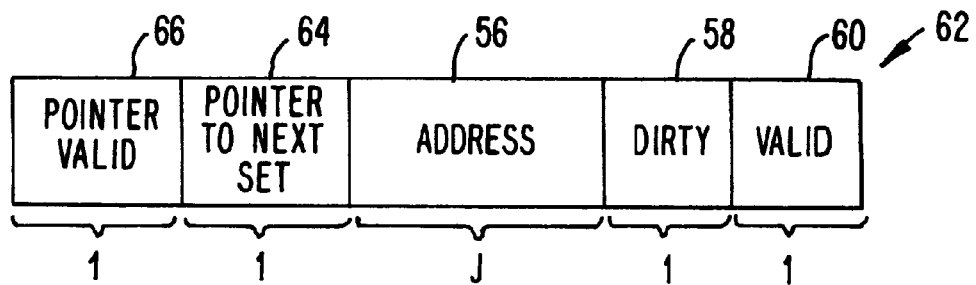
FIG. 4 is a diagram of a cache tag according to one embodiment of the present.

According to one embodiment, the tag 62, as depicted in FIG. 4 which is associated with a particular word in a two-way set-associative cache includes a one-bit pointer 64 and a one-bit "pointer valid" flag 66 in addition to the normal tag fields 56, 58, 60. In a two-way set-associative cache, the next word in an instruction thread following the last word in a cache line will be either in the same set as the access word or in the other set. Accordingly, only a single bit 64 is needed to point to the set which contains the next-succeeding line in the instruction thread. Since the next succeeding line will be either valid or invalid, only a single bit 66 is needed as a "pointer valid" tag. Thus, according to one embodiment of the invention, the tag is expanded by two bits per word in order to implement this embodiment of the invention. FIG. 1 depicts such a cache coupled to appropriate other hardware for operation.

FIG. 1 depicts a simplified configuration of an instruction cache memory system 10. An instruction cache 20 is disposed between main memory 24 and an execution unit 12. A number of other execution units 13 may also be coupled to main memory 24.

Figure 5:
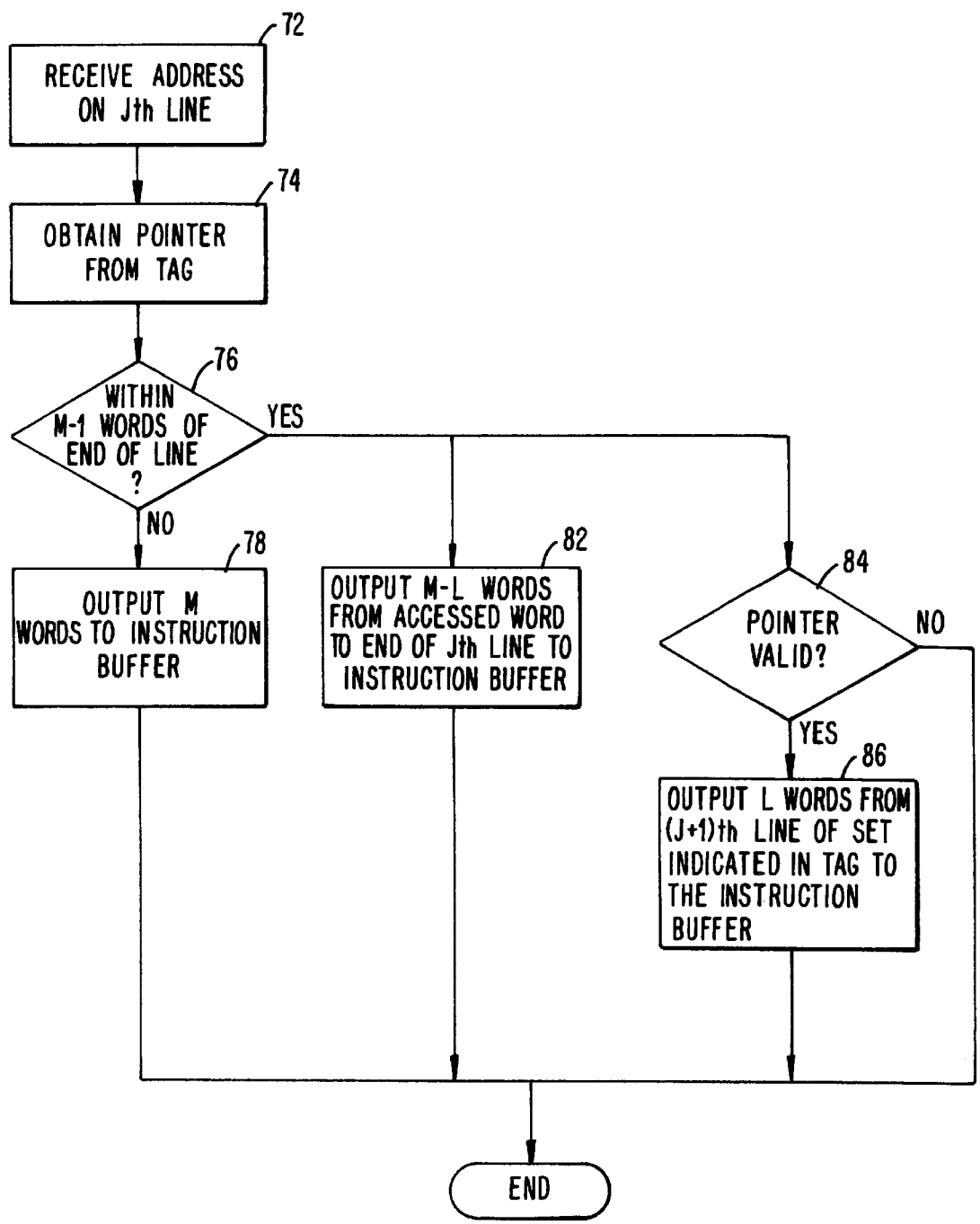
FIG. 5 is a flow diagram showing a method for accessing instructions from an instruction tag according to an embodiment of the present invention.

As depicted in FIG. 5, when the tag receives an address which resides on the jth line of a set of the cache 72 the tag is examined and the pointer 64 is obtained 74. If the word to be accessed using the address is not within M-1 words of the end of the line 76, where M is the number of words output to the instruction buffer 26 during a normal access to the cache 20, M words are output to the instruction buffer 26 in step 78. However, if the addressed word is within M-1 words of the end of the line, the cache 20 outputs all the words remaining in the jth line from the access to the end of the line, a total of M-L words 82 and, if the pointer valid tag indicates that the pointer is valid 84 also outputs L words from the (j+1)th line of whichever set is indicated by the pointer obtained in step 74, to the instruction buffer 26 in step 86.

Figure 2:
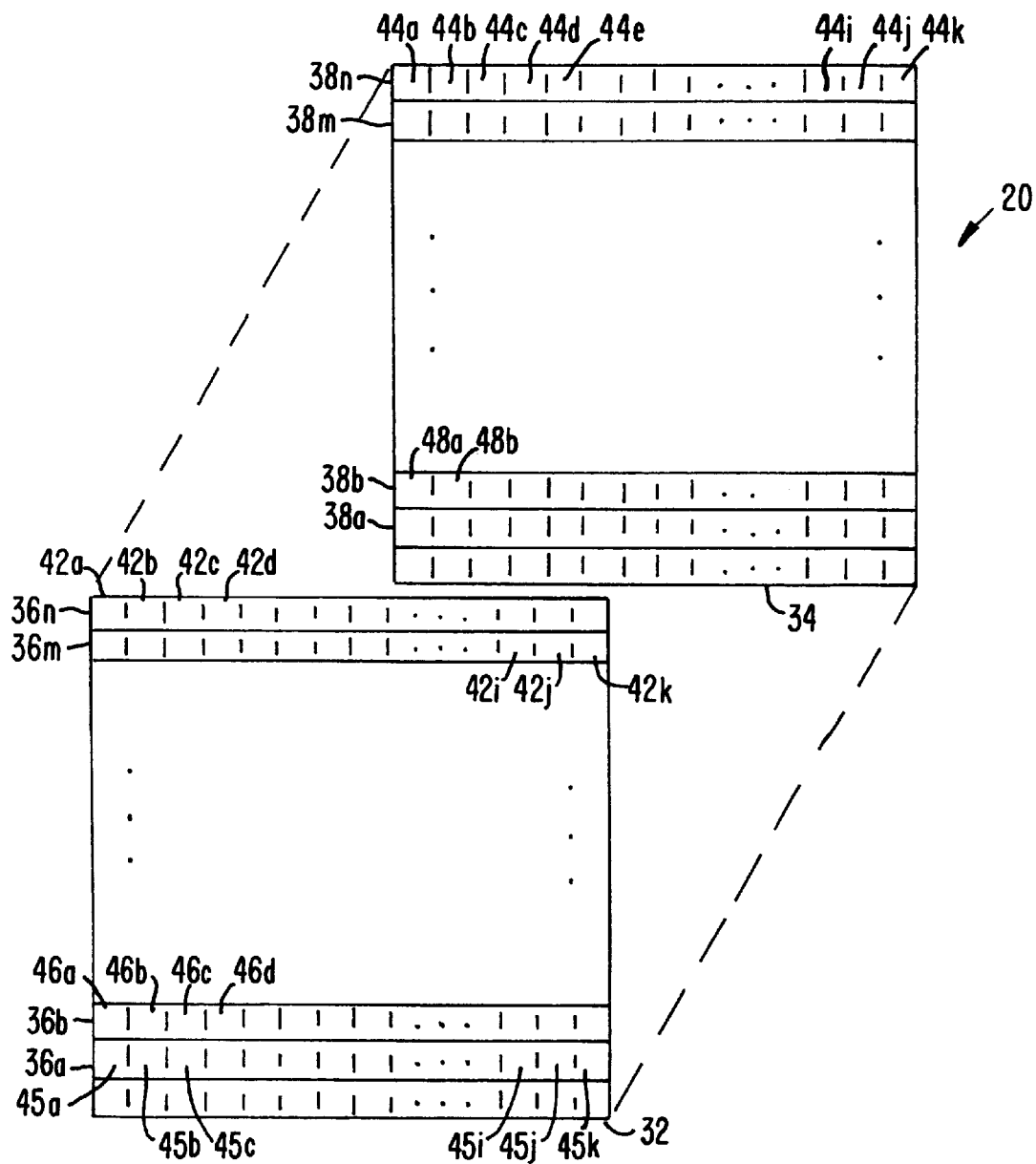
FIG. 2 is a schematic diagram of a two-way set-associative cache.
Figure 3:
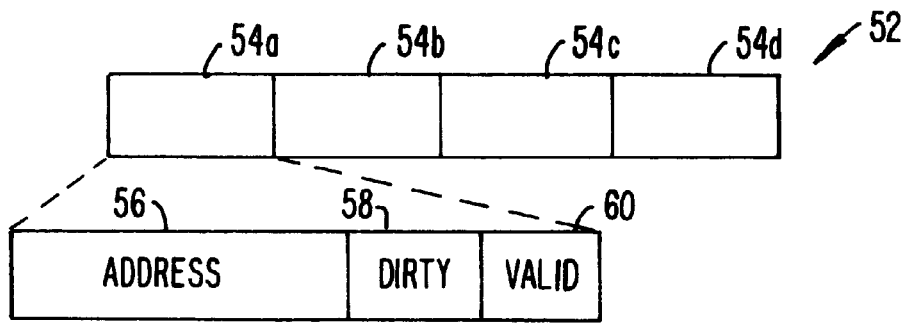
FIG. 3 is a diagram of the structure of a cache tag.

Referring now to FIG. 2 as one example, it is assumed that a value of zero in the pointer 64 represents the first set 32 and a value of 1 represents the second set 34. Suppose, for example, that cache 20 receives a read address for word 45*j* on line 36*a* of set 32. Further suppose that when tag 62 is inspected it is found that the pointer 64 for the word 45*j* is equal to "one" (indicating the use of second set 34). In response, the cache 20 will output two words 45*j* and 45*k* from line 36*a* and two words 48*a* and 48*b* from line 38*b* of the second set 34 of the cache 20 (provided the "pointer valid" flag 66 indicates that the pointer 64 is valid).

Preferably, the output of words 45*j*, 45*k* from line 36*a* and words 48*a* and 48*b* from line 38*b* are done within the time of a single cache memory access, e.g., by appropriate configuration of the address decoders of the cache 20. For example, the decoding in one embodiment could be achieved by circuitry such as that used in some memory redundancy structures where the repair circuitry shifts the row or column decode wiring by one or more rows or columns respectively. One such scheme is described in: Mori, Shigeru, et. al., "A 45-ns 64 Mb DRAM with a Merged Match-Line Test Architecture", IEEE Journal of Solid-State Circuits, Vol 26, no. 11, November 1991, pp. 1486–1492. Such a decoding scheme, for example, could be used to permit use of segmented word lines. A decoded starting point within a line may replace the fuse structure of the Mori reference to allow partial access of adjacent word lines. Other decoding schemes allowing access to separate lines may also be used.

For the system to operate properly, the computer system must be configured to store the correct information in the tags, such as the correct pointer information 64. This information must be correctly stored in the tags when, e.g., a new line of data is loaded into the cache 20 from the main memory 24 and/or must be revised when, for example, a line of the cache is invalidated. Although it would be possible to design and build circuitry dedicated to this task, it is preferable to minimize costs by employing circuitry which is already available in the computer and has the necessary information. The bus watch device 28, having a configuration well known in the art, is a device which can be used to generate the information needed to correctly store the pointers 64. Typically a bus watch device 28 contains circuitry which can determine which addresses succeed or match other sets of addresses. This information is needed to determine, for data near or at the end of a cache line, whether the succeeding line is in the same set or another set.

One exception to employing the method depicted in FIG. 5 occurs when the end of a line coincides with a page boundary. In this case, the method of FIG. 5 should not be used, i.e., data from the next succeeding line should not be output, even when it can be determined. This is because items such as protection levels may differ across page boundaries and thus, when crossing a page boundary, it is preferable to force the system to consult the TLB 17 rather than to automatically output words from the next succeeding line.

Figure 6:
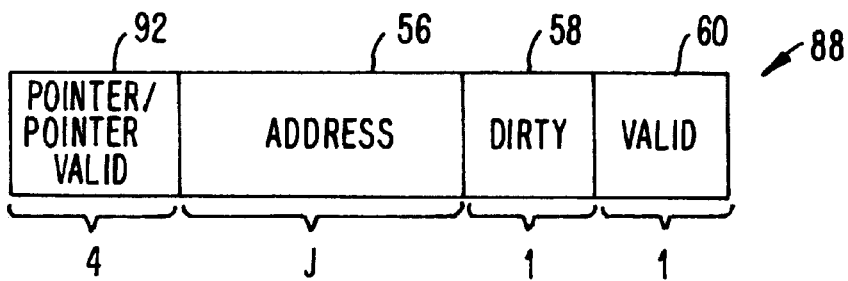
FIG. 6 is a diagram of the structure of a tag according to one embodiment of the present invention.

FIG. 6 depicts a tag portion 88 for a single word in a four-way set-associative cache. Since a four-way set-associative cache has four sets, two bits are needed to point to one of four sets and one additional bit is needed for a "pointer valid" flag. Accordingly, it would be possible to implement the system of the present invention for a four-way set-associative cache by providing only three additional bits for the tag for each word (or at least for words near the end of each line). However, for implementation reasons according to one embodiment it is preferred to provide four bits 92 for this purpose. The four bits 92 can be used by letting each bit point to one of the four sets, such as having a "one" value in the corresponding bit position to indicate a particular set. Accordingly, the four-bit pointer 92 has a value 1000 to point to the first set 0100 to point to the second set 0010 to point to the third set and 0001 to point to the fourth set. Any other value can be used as the "pointer invalid" flag (such as 0000).

In light of the above description, advantages of the present invention are apparent. The present invention improves the average number of words output per cache access over previous methods. The present invention avoids the overhead which can occur when a cache access returns an indication that words are not available, such as the need to consult the TLB.

A number of variations of the present invention can be used. The present invention can be used with N-way set-associative caches other than two-way or four-way caches. The present invention can be used with caches other than instructions caches. The present invention can be used with different structures of tags. The present invention can store pointers in locations other than tag locations although the information is preferably available at the same the tag information is available.

Although the present invention has been described by way of a preferred embodiment with certain variations and modifications, other variations and modifications can also be used. Consequently, the scope of the invention should be ascertained by the following claims.

What is claimed is:

1. In a computer having an N-way set-associative cache having N-compartments, each compartment organized into a plurality of multi-word lines wherein said cache receives a tag word, including an address, and in response outputs M words wherein N is greater than or equal to 2 and M is greater than or equal to 2, a method for assuring output of the correct M words, and wherein each word in the cache does not carry with it an address of a successive word in the cache, the method comprising the steps of:

providing to said cache a first address of a target word held within a line of one of said N compartments;

providing to said cache first information indicating which of the N compartments contains a line holding at least one other word which succeeds words at the end of the line holding said target word; and when said target word is within M-1 words of the end of said line, outputting from said cache M words including said target word and said at least one other word.

2. A method as claimed in claim 1 wherein said first information is contained in a cache tag.

3. A method as claimed in claim 1 further comprising inputting, to said cache, second information indicating whether said first information is valid.

4. A method as claimed in claim 1 wherein said cache is an instruction cache.

5. A method as claimed in claim 1 wherein M is greater than or equal to 4.

6. A method as claimed in claim 1 wherein N is equal to 2 and said first information is a single bit.

7. A method as claimed in claim 1 wherein N is equal to 4 and said first information is stored in two bits.

8. A method as claimed in claim 3 wherein N is equal to 4 and said first information and said second information is stored in four bits.

9. A method as claimed in claim 1 wherein said cache includes a plurality of page boundaries and wherein said step of outputting is performed only when said target word and said other word are not on opposite sides of a page boundary.

10. In a computer having an N-way set-associative cache having N banks, each bank organized into a plurality of lines holding a plurality of words, wherein each word in the cache does not carry with it an address of a successive word in the cache, and wherein said cache receives a tag word, including an address, and, in response, outputs M words, wherein N is greater than or equal to two and M is greater than or equal to two, apparatus for assuring output of the correct M words, comprising:

data storage in said cache, for receiving a first address of a target word held in a line of one of said banks;

additional data storage for receiving, substantially simultaneously with said receipt of said first address of said target word, first information indicating which of the N banks contains a line holding at least one other word which succeeds the word at the end of the line holding said target word; and a circuit for providing from said cache, when said target word is within M-1 words of the end of said line, M words including said target word and said at least one other word.

11. An apparatus as claimed in claim 10 wherein said first information is contained in a cache tag.

12. An apparatus as claimed in claim 10 further comprising means for receiving second information indicating whether said first information is valid.

13. An apparatus as claimed in claim 10 wherein said cache is an instruction cache.

14. An apparatus as claimed in claim 10 wherein M is greater than or equal to 4.

15. An apparatus as claimed in claim 10 wherein N is equal to 2 and said first information is a single bit.

16. An apparatus as claimed in claim 10 wherein N is equal to 4 and said first information is stored in two bits.

17. An apparatus as claimed in claim 12 wherein N is equal to 4 and said first information and said second information is stored in four bits.

18. An apparatus as claimed in claim 10 wherein said cache includes a plurality of page boundaries and wherein said means for outputting outputs said target word and said at least one other word only when said target word and said other word are not on opposite sides of a page boundary.

19. An apparatus as claimed in claim 10 wherein said first address is a real address.

20. An apparatus as claimed in claim 10 wherein said first address is a virtual address.

* * * * *